US011969809B2

(12) United States Patent
Rampling (10) Patent No.: US 11,969,809 B2
(45) Date of Patent: Apr. 30, 2024

(54) CUTTING TOOL (71) Applicant: SCOTT CUTTERS LIMITED, Beaconsfield (GB)

(72) Inventor: Scott Rampling, Beaconsfield (GB)

(73) Assignee: SCOTT CUTTERS LIMITED, Beaconsfield (GB)

( * ) Notice: Subject to any disclaimer, the term of this patent is extended or adjusted under 35 U.S.C. 154(b) by 0 days.

(21) Appl. No.: 17/700,178

(22) Filed: Mar. 21, 2022

(65) Prior Publication Data
US 2022/0305574 A1 Sep. 29, 2022

(30) Foreign Application Priority Data
Mar. 24, 2021 (GB) ...................................... 2104105

(51) Int. Cl.
B23D 21/06 (2006.01)
B26D 3/16 (2006.01)

(52) U.S. Cl.
CPC .............. *B23D 21/06* (2013.01); *B26D 3/169* (2013.01)

(58) Field of Classification Search
CPC ........ B23D 21/06; B23D 21/08; B23D 21/10; B26D 3/169; B26D 3/166; B26D 3/16

USPC ........................................................ 30/94–96
See application file for complete search history.

(56) References Cited

U.S. PATENT DOCUMENTS

| 2012/0247286 A1 | | 2/2012 | Huang | |
| 2020/0223086 A1 | * | 7/2020 | Rampling | ................ B26D 3/16 |
| 2020/0346291 A1 | * | 11/2020 | Canis | ..................... B23D 21/10 |

FOREIGN PATENT DOCUMENTS

| EP | 3450070 A1 | * | 3/2019 | ............ B23D 21/10 |
| FR | 2782938 A1 | | 3/2000 | |
| GB | 2457346 A | | 8/2009 | |
| GB | 2558990 A | | 7/2018 | |
| GB | 2583502 A | | 11/2020 | |
| WO | 2005092550 A1 | | 10/2005 | |

* cited by examiner

Primary Examiner — Jennifer S Matthews
(74) Attorney, Agent, or Firm — Craft Chu PLLC; Andrew W. Chu (57) ABSTRACT A cutting tool for cutting pipes of varying diameters includes a body having an opening extending along a predetermined axis through the body, and a cutting blade extending into the opening along a plane extending at right angles to the predetermined axis. The body includes a plurality of pipe support members, which are spaced from one another and configured to contact an outer surface of a pipe received by the tool, and a plurality of flexible connection members that connect the pipe support members to one another.

15 Claims, 7 Drawing Sheets

CUTTING TOOL

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present disclosure relates to a cutting tool, in particular to such a cutting tool that is suited for cutting pipes having a range of different diameters.

2. Description of Related Art Including Information Disclosed Under 37 CFR 1.97 and 37 CFR 1.98

Plastic piping is increasingly used in plumbing systems to feed water, replacing conventionally used copper piping due to its comparatively low cost.

It is further used, for example, in the electrical field for the passage of electrical cables, or otherwise.

Conventional cutting tools typically involve engaging the pipe between a pair of spaced rollers and a cutting disc, and rotating the tool about the pipe whilst the tool is progressively tightened by means of a screw mechanism. The process of incrementally tightening and rotating the tool eventually results in the total severance of the pipe into two lengths. However, such tools are relatively expensive and their operation is somewhat tedious. Also, when used with plastic pipes, the pressure exerted by the tool can cause deformation of the pipe.

UK Patent No GB 2457346 discloses a cutting tool suitable for cutting a plastic pipe having a predetermined external diameter. Whilst providing a highly effective cutting tool, it is not suitable for cutting plastic pipes of varying diameters and thus a range of differently sized cutting tools are needed to cut differently sized conduits.

UK Patent Application No GB 2583502 discloses an alternative cutting tool that is configured for cutting a pipe of a specific diameter. It comprises a rigid hinged body.

UK Patent No GB 2558990 improves upon the above arrangements, disclosing a cutting tool that is suitable for cutting pipes of varied diameters. Differently sized pipes are accommodated by the cutter by virtue of a flexible conduit holder that is provided within an opening of a body of the tool. Whilst this tool is effective, there remains scope for a yet further improved tool.

BRIEF SUMMARY OF THE INVENTION

The present invention arose in a bid to provide an improved cutting tool for the cutting of pipes having a range of different diameters.

Representative features are set out in the following clauses, which stand alone or may be combined, in any combination, with one or more features disclosed in the text and/or drawings of the specification.

According to the present invention in a first aspect, there is provided a cutting tool for cutting pipes of varying diameters, the tool comprising a body having an opening extending along a predetermined axis through the body, and a cutting blade extending into said opening along a plane extending at right angles to said predetermined axis, wherein the body comprises a plurality of pipe support members, which are spaced from one another and configured to contact an outer surface of a pipe received by the tool, and a plurality of flexible connection members that connect the pipe support members to one another.

By such an arrangement, there is provided a cutting tool that may cleanly and squarely cut pipes of a range of diameters. The unique provision of a plurality of pipe support members that are connected to one another by flexible connection members allows for a cutting tool that has excellent torsional strength whilst maintaining sufficient flexibility to conform to a range of differently sized pipes.

The pipe support members are preferably rigid. By rigid, it is meant that they are substantially inflexible during normal use of the cutting tool, i.e. grasped in the hand of a user during a pipe cutting operation. They will always be less flexible than the connection members.

Preferably each of the pipe support members extends longitudinally along an axis that is substantially parallel to the predetermined axis.

The form of the pipe support members is not particularly limited, as long as they are relatively inflexible as compared to the connection members. They may be open along their lengths. They may alternatively be closed along their lengths. They may comprise rods or tubes. They may have a have a curved or polygonal profile. They may, for example, be round, oval, square, triangular, or trapezoidal in profile.

It is most preferable that the body, or at least a main body portion thereof, is unitarily formed. Regardless, the pipe support members and the flexible connection members are preferably integrally/unitarily formed.

The flexible connection members may comprise living hinges.

The opening preferably comprises an open mouth for the insertion of a pipe into the opening.

There may be at least three of the pipe support members. It is preferable that one of the flexible connection members is provided between each adjacent pair of the pipe support members. The pipe support members are preferably arranged in a circumferential array.

The pipe support members may define a thickness of the body in a radial direction. An outer surface of the cutting tool may be formed at least in part by the pipe support members.

The outer surface of the cutting tool may be substantially wholly formed by the pipe support members and the connection members.

BRIEF DESCRIPTION OF THE SEVERAL VIEWS OF THE DRAWINGS

Non-limiting embodiments of the invention will now be discussed with reference to the following drawings.

DETAILED DESCRIPTION OF THE INVENTION

Figure 1:
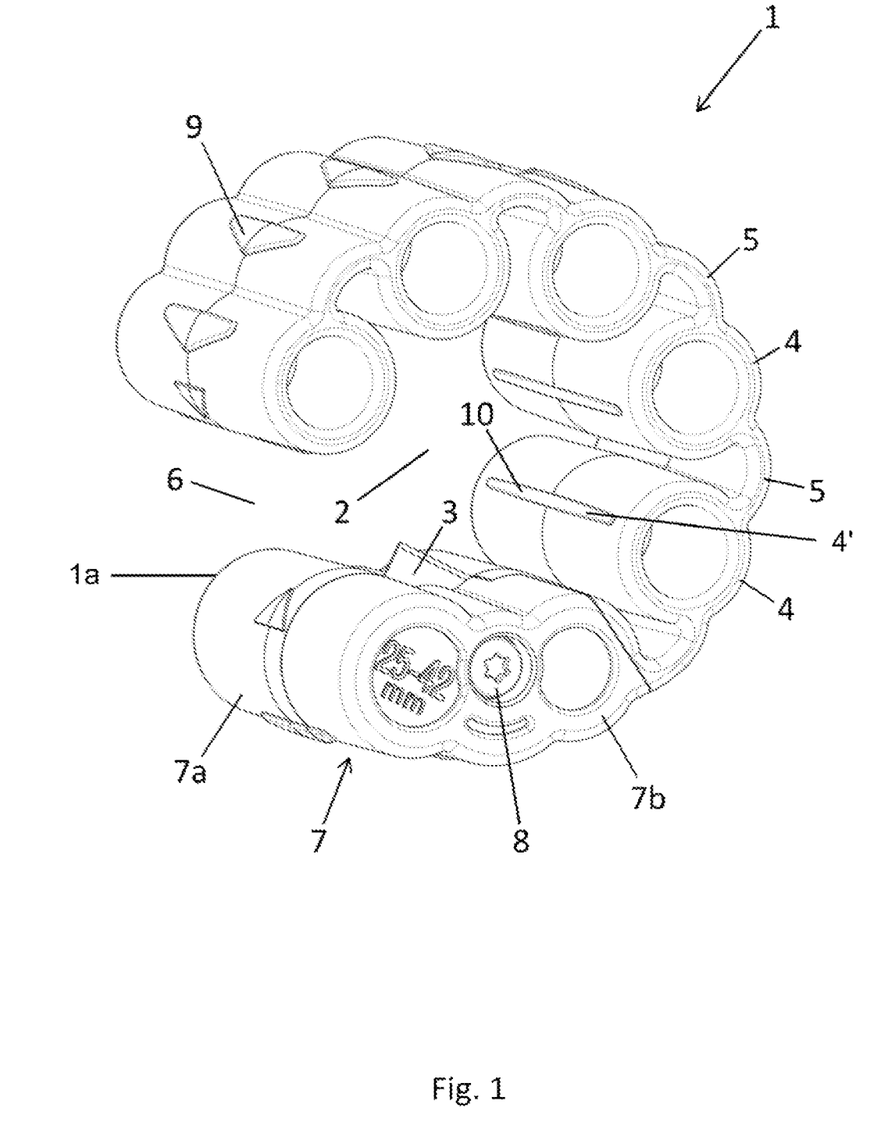
FIG. 1 shows a front perspective view of a cutting tool according to a first embodiment.
Figure 2:
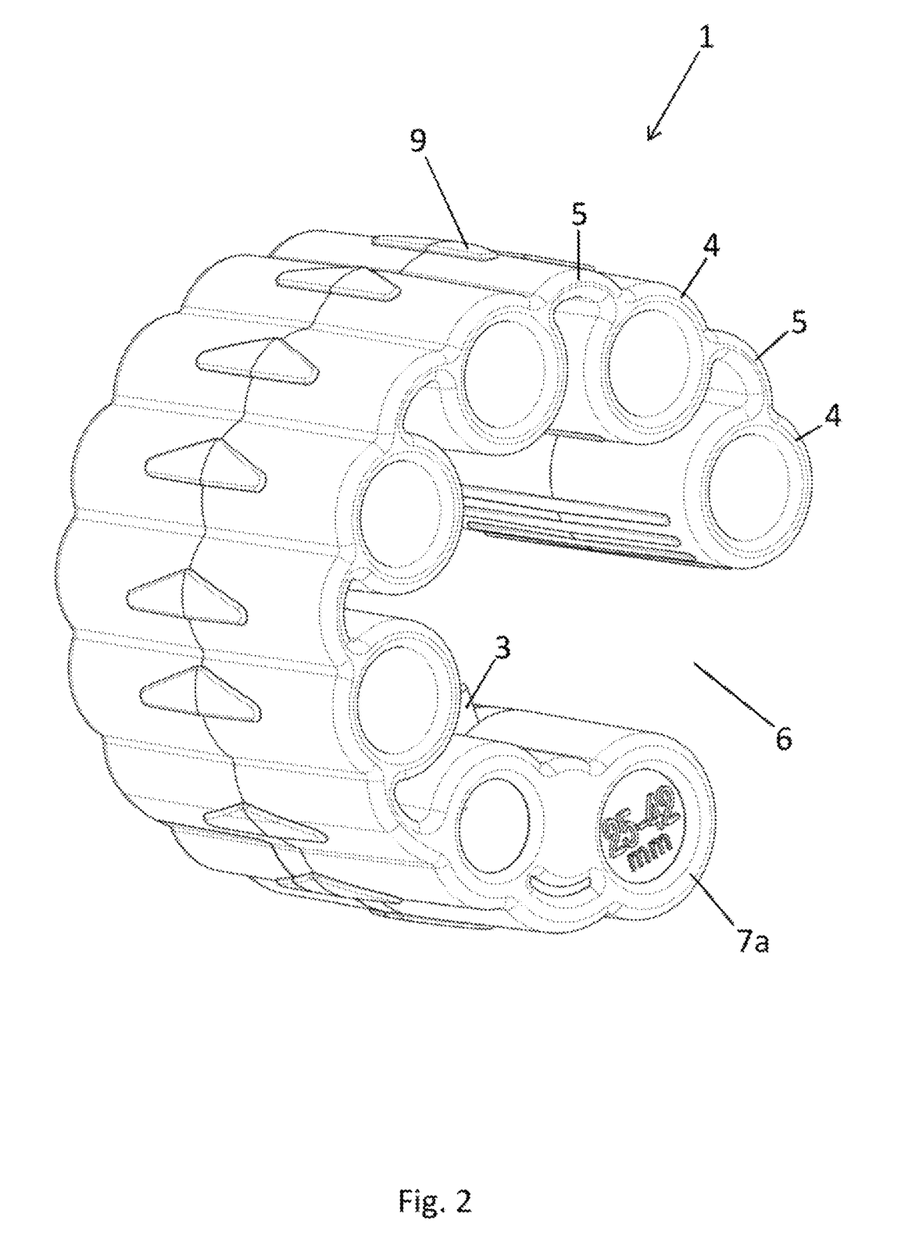
FIG. 2 shows a rear perspective view of the cutting tool of FIG. 1.

FIG. 1 shows a cutting tool for cutting pipes of varying diameters. The tool comprises a body 1a having an opening 2 extending along a predetermined axis through the body. A cutting blade 3 is provided, which extends into the opening 2 along a plane extending at right angles to said predetermined axis. The body 1a comprises a plurality of pipe support members 4 (first pipe support member 4a, second pipe support member 4b, third pipe support member 4c), which are spaced from one another and have outer pipe surface contacts 4' (first outer pipe surface contact 4'a, second outer pipe surface contact 4'b, third outer pipe surface contact 4'c) configured to contact an outer surface of a pipe received by the tool 1. The body 1a further comprises a plurality of flexible connection members 5 (first flexible connection member 5a, second flexible connection member 5b, third flexible connection member 5c, a blade portion flexible connection member 7c) that connect the pipe support members 4 to one another.

In the present arrangement, as is preferred, the opening comprises an open mouth 6 for the insertion of a pipe into the opening 2. The arrangement of the tool 1 is such that the insertion of a pipe into the mouth 6 will cause the body to open up with portions of the body either side of the mouth flexing away from one another, by virtue of the flexibility of the connection members 5, as the pipe is inserted. Once the pipe has passed though the mouth 6 to be fully received by the opening 2, a resiling of the body will occur with the body conforming to the pipe, with the pipe support members 4 contacting and supporting the pipe, and the pipe urged against the blade 3. Relative rotation between the tool 1 and the pipe about the predetermined axis will result in the severing of the pipe.

Figure 3:
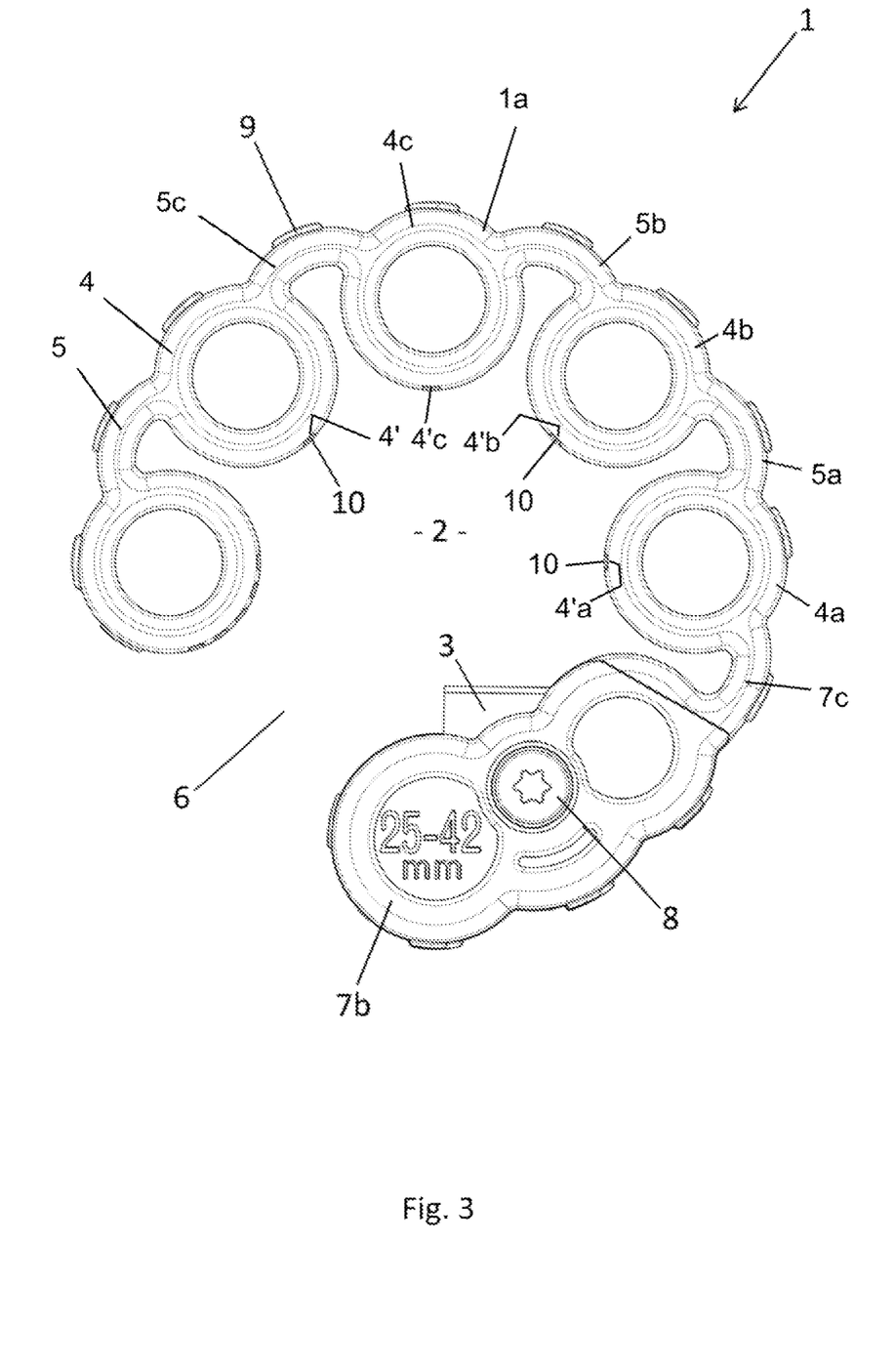
FIG. 3 shows a side elevation view of the cutting tool of FIG. 1.
Figure 4:
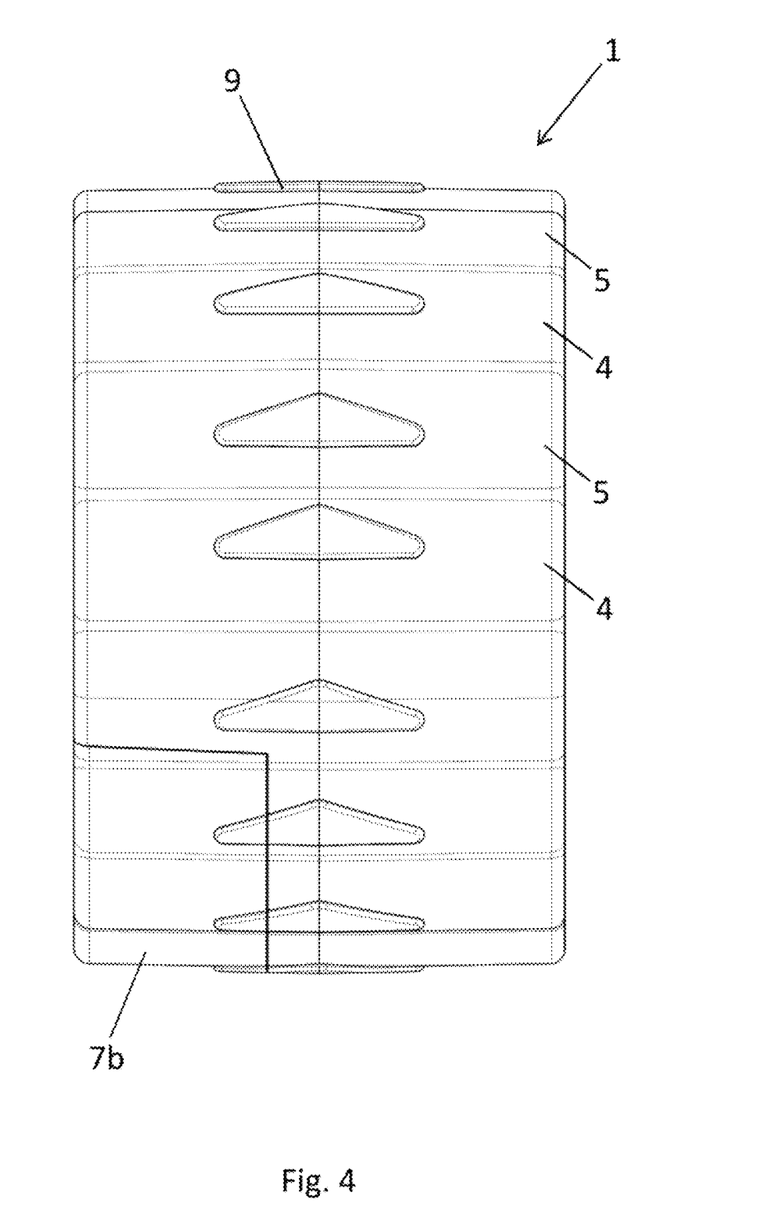
FIG. 4 shows a rear elevation view of the cutting tool of FIG. 1.

The pipe support members 4 are most preferably rigid, such that they will not flex along their length during use of the tool. This enhances the torsional strength of the cutting tool 1. In the present arrangement, as clearly shown, they comprise tubes, which are open at their ends and closed along their lengths. They have a circular profile, as best seen in FIG. 3. This arrangement is preferred, since the tubes provide excellent stiffness, aid in presenting an outer profile of the cutter that offers good grip and is comfortable to hold, and provide a desirable aesthetic to the cutting tool. Each of the pipe support members 4 extends longitudinally along an axis that is substantially parallel to the predetermined axis.

It must be noted that the pipe support members may alternatively be solid, such that they provide rods rather than tubes. Irrespective of whether the pipe support members 4 comprise rods or tubes, they may have a profile that is other than circular. They may have any of a range of alternative curved or polygonal profiles, including but not limited to oval, square, triangular, or trapezoidal.

Whilst all of the pipe support member arrangements discussed above are closed along their lengths, it should be noted that in alternative arrangements the pipe support members 4 could be open along their lengths instead. They could, for example have open backs such that the body of the cutting tool 1 has an undulating or zig-zagging profile. They could be otherwise formed to be at least partially open along their lengths. Open pipe support members 4 could take any of the described forms above, being polygonal or curved.

Where the pipe support members 4 take a form that is less inherently stiff, for example due to an open form, then they may be stiffened relative to the flexible connection members 5 by rendering them thicker, by providing stiffening elements, or otherwise.

As is the case in the present arrangement, the pipe support members 4 and the flexible connection members 5 are preferably integrally/unitarily formed. With such an arrangement, the body, or at least a main body portion of the body, may be unitarily formed. It may be moulded in one piece. The pipe support members 4 and the flexible connection members 5 are preferably formed from the same material, such as a suitable plastic. They may be formed from different materials, such as different plastics. It must be appreciated that in alternative arrangements the pipe support members 4 and the flexible connection members 5 could be separately formed and joined to one another, by bonding or otherwise.

The flexible connection members in the present arrangement may be considered to comprise living hinges. They are shown to project outwardly with a curved profile, as best seen in FIG. 3. They need not be curved. They could be straight or bent. Also, they need not project outwardly. They could extend generally circumferentially or project inwardly, or be otherwise arranged. Moreover, whilst they are shown to provided adjacent an outer periphery of the tool, they could be moved radially inwardly, i.e. they could be connected to the pipe support members 4 closer to a centre point of the opening 2 defined by the body.

There are preferably at least three of the pipe support members 4 although arrangements comprising only two of the pipe support members 4 will be possible. In the arrangement of FIGS. 1 to 4, there are five of the pipe support members 4 provided. It is to be noted, as discussed further below, that there may be a range of the cutting tools provided. The different cutting tools of the range may have different sizes and may vary in the number of pipe support members 4 provided. Regardless of the number of pipe support members 4 provided, it is preferable as in the present arrangement that one of the flexible connection members 5 is provided between each adjacent pair of the pipe support members 4, i.e. the pipe support members 4 and flexible connection members 5 alternate with one another. The pipe support members 4 are preferably arranged in a circumferential array as shown.

An advantage of cutting devices according to the principals of the present device is that that are smaller, with a lower profile, as compared to the other bulkier prior art designs. This is beneficial since they can be readily pocketed by a user, and they are also more manageable to use in the palm of the hand. This is particularly beneficial for variants configured for the cutting of larger diameter pipes. A suitably low profile can be achieved by reducing the diameter of the pipe support members 4 whilst increasing their number, so as to minimise the overall width of the device, while maintaining adequate torsional strength.

In the present arrangement, as is preferred, an outer surface of the cutting tool is formed at least in part by the pipe support members 4. In the present arrangement, as may be seen, the outer surface of the cutting tool is formed by the pipe support members 4 and the connection members 5. An undulating or ridged outer surface is provided, which provides for excellent grip during use of the cutting tool.

In the present arrangement, as is preferred, the pipe support members 4 define the thickness of the body in a radial direction.

The cutting blade 3 is most preferably square or rectangular in shape, as in the present arrangement. The cutting blade may alternatively be arcuate or circular. In arrangements comprising a circular blade, the circular blade may be rotatably attached within the body.

In the present arrangement, as is preferred, the body comprises a blade support portion 7, which comprises a first portion 7a, which forms part of a main body portion comprising the pipe support members 4 and the connection members 5, and a second portion 7b, which is detachable from the main body portion. As discussed above, the first portion 7a is preferably unitarily formed with the pipe support members 4 and the connection members 5. The second portion 7b is provided to clamp the blade 3 against the first portion 7a. A screw 8 or other suitable fixing is provided for attaching the first and second portions 7a, 7b to one another. With removal of the second portion 7b, the blade 3 may be accessed for replacement. The first or second portion may be provided with a void for storing spare blades. In alternative arrangements, the first and second portions 7a, 7b may be arranged to remain attached to one another during a blade changing operation. They may, for example, be pivotally connected to one another, or otherwise. In further, less preferred arrangements, the entire body may split. The body could be formed in two axial halves which are arranged to be joined together with the blade sandwiched between the two axial halves. Each of the two axial halves may be unitarily formed. Further, arrangements are possible in which the blade is irremovable. Here the entire body may be moulded in a single part with the blade embedded in the body during moulding. Finally, it is possible that the blade support portion is omitted, wherein in this case the blade will be supported by one or more of the pipe support members 4. In this case the body may be unitarily formed with the blade irremovable or may be split in two with the blade sandwiched there between, as discussed above.

In the present arrangement, there are guide arrows 9 moulded on the outer face of the tool for indicating the direction of rotation during a cutting operation. These are not essential and may be omitted. They may otherwise be replaced with printed arrows, indented arrows, or other guidance information.

In the present arrangement, the support members 4 comprise support elements 10. These support elements 10 take the form of ribs that extend along the support member 4 and contact the outer surface of the pipe during use. They are integrally moulded with the support members 4. These again are not essential and may be omitted or take an alternative form. For example, each support element 10 could be discontinuously formed from a number of smaller spaced elements.

As discussed, whilst the cutting tool as described is capable of cutting pipes having a variety of diameters, and may be provided individually, the cutting tool may form part of a set a cutting tools, each of which cuts a different range of pipe diameters.

For example, based on pipes commonly found in the UK, EU and Australia, there may be three different cutting tools in a particular set:

Of course, differently sized tools in accordance with the principles discussed here may be provided to suit any specific markets or pipe diameters as appropriate. The design is entirely scalable up and down, as will be readily appreciated by those skilled in the art.

Figure 5:
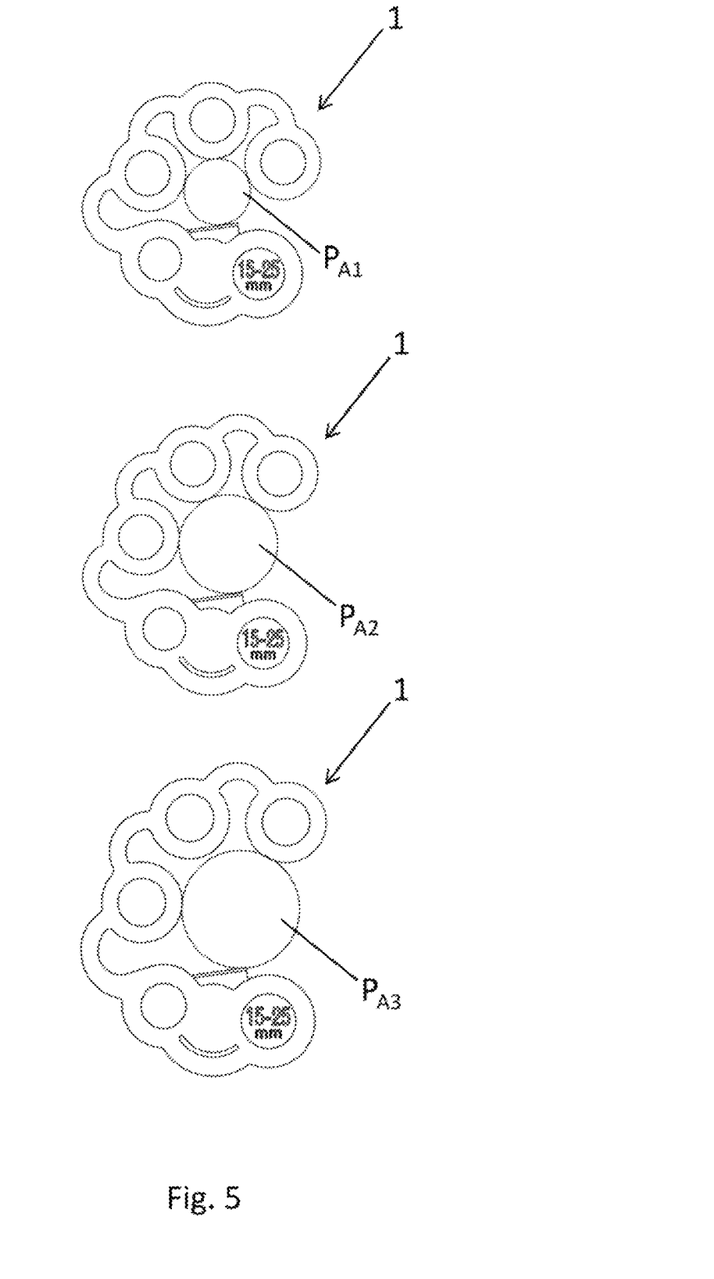
FIG. 5 shows side elevation views of an exemplary cutter, which is configured to cut pipes having outer diameters of between 15 and 25 mm, during engagement of pipes having outer diameters of 15, 22 and 25 mm.
Figure 6:
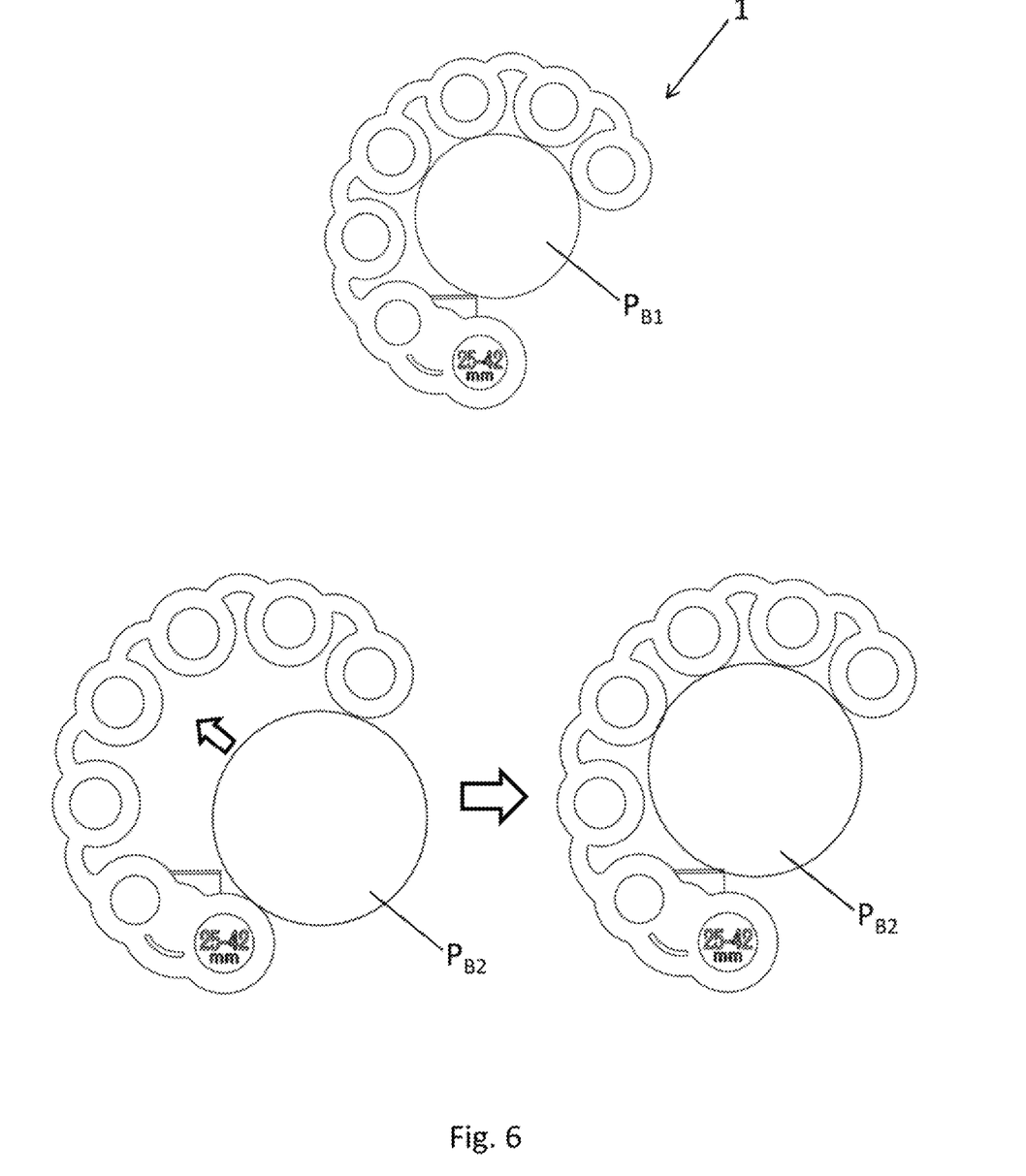
FIG. 6 shows side elevation views of an exemplary cutter, which is configured to cut pipes having outer diameters of between 25 and 42 mm, during engagement of a pipe having an outer diameter of 35 mm and during insertion and subsequent engagement with a pipe having an outer diameter of 42 mm.
Figure 7:
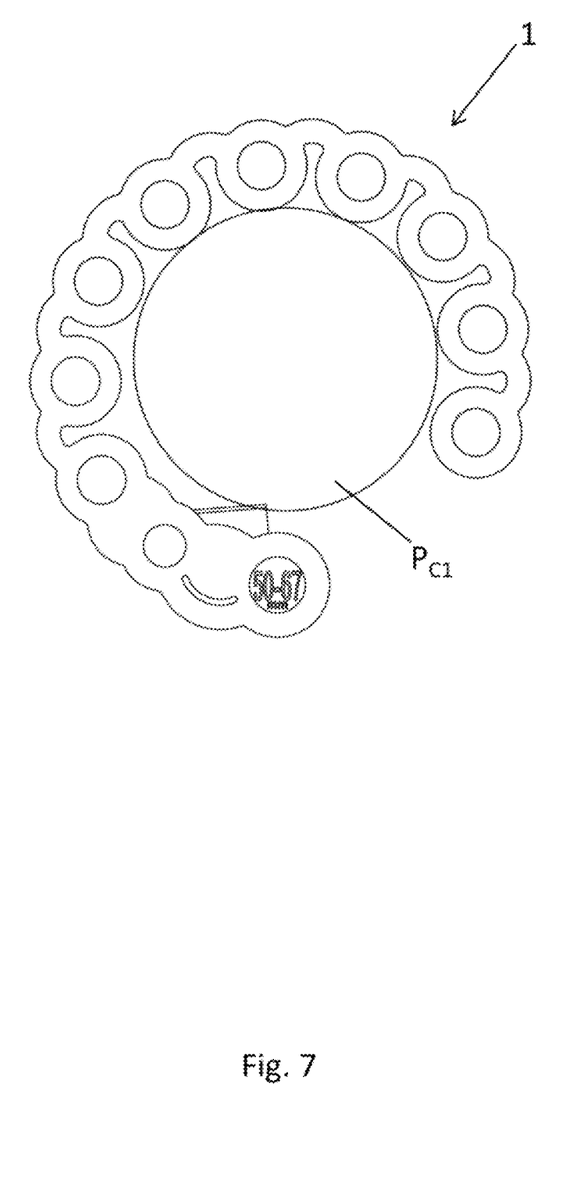
FIG. 7 shows a side elevation view of an exemplary cutter, which is configured to cut pipes having outer diameters of between 50 and 67 mm, during engagement of a pipe having an outer diameter of 50 mm.

FIGS. 5 to 7 show the three exemplary cutters A, B and C detailed in the table above in use. FIG. 5 shows, from top to bottom, cutter A separately engaging pipes PA1, PA2 and PA3 having outer diameters of 15 mm, 22 mm and 25 mm, respectively. FIG. 6 shows cutter B engaging a pipe PB1 having an outer diameter of 35 mm and, separately, the insertion and subsequent engagement of a pipe PB2 having a diameter of 42 mm. FIG. 7 shows cutter C engaging a pipe PC1 having an outer diameter of 50 mm. The different cutters vary from one another principally in respect of the number of pipe support members 4.

Numerous alternative arrangements and modifications to the cutters as described herein will be readily appreciated by those skilled in the art within the scope of the appended claims.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

I claim:

1. A cutting tool 1 for cutting pipes of varying diameters, comprising:
    a body 1a having an opening 2 extending along a predetermined axis through said body,
    wherein said body comprises:
        a plurality of pipe support members 4, each pipe support member of said plurality of pipe support members being spaced from an adjacent pipe support member of said plurality of pipe support members and having an outer pipe surface contact 4',
wherein a first pipe support member 4a of said plurality of pipe support members is spaced from a second pipe support member 4b of said plurality of pipe support members, and
wherein said second pipe support member is spaced from a third pipe support member 4c of said plurality of pipe support members;
a plurality of flexible connection members 5,
wherein at least one flexible connection member of said plurality of flexible connection members connects adjacent pipe support members of said plurality of pipe support members,
wherein a first flexible connection member 5a of said plurality of flexible connection members connects said first pipe support member to said second pipe support member, and
wherein a second flexible connection member 5b of said plurality of flexible connection members connects said second pipe support member to said third pipe support member; and
    a blade support portion 7 being connected to said first pipe support member by a blade support flexible connection member 7c; and
    a cutting blade 3 mounted to said blade support portion so as to extend into said opening along a plane extending at right angles to said predetermined axis,
wherein respective outer pipe surface contacts of each pipe support member of said plurality of pipe support members are arranged around said predetermined axis so as to align an outer surface of a pipe received in said opening with said cutting blade,
wherein a respective outer pipe surface contact of said first pipe support member, said blade support flexible connection member, and said first flexible connection member are arranged around said predetermined axis,
wherein a respective outer pipe surface contact of said second pipe support member, said blade support flexible connection member, said first flexible connection member, and said second flexible connection member are arranged around said predetermined axis.

2. The cutting tool as claimed in claim 1, wherein each pipe support member of said plurality of pipe support members is rigid.

3. The cutting tool as claimed in claim 1, wherein each [each] pipe support member of said plurality of pipe support members has a pipe support axis parallel to said predetermined axis.

4. The cutting tool as claimed in claim 1, wherein each pipe support member of said plurality of pipe support members is open ended.

5. The cutting tool as claimed in claim 1, wherein the pipe support members are comprised of rods or tubes.

6. The cutting tool as claimed in claim 1, wherein each pipe support member of said plurality of pipe support members has a curved or polygonal profile.

7. The cutting tool as claimed in claim 1, wherein each pipe support member of said plurality of pipe support members has a profile selected from a group consisting of: round, oval, square, triangular, and trapezoidal.

8. The cutting tool as claimed in claim 1, wherein the pipe support members and the flexible connection members are made integral so as to form said body 1a.

9. The cutting tool as claimed in claim 1, wherein the flexible connection members are comprised of living hinges.

10. The cutting tool as claimed in claim 1, wherein the pipe support members are arranged in a circumferential array.

11. The cutting tool as claimed in claim 1, wherein the pipe support members define a thickness of the body in a radial direction.

12. The cutting tool as claimed in claim 1, wherein said body has an outer body surface being comprised of said plurality of pipe support members.

13. The cutting tool as claimed in claim 12, wherein said outer body surface is further comprised of said plurality of flexible connection members.

14. A cutting tool 1 for cutting pipes of varying diameters, comprising:
a plurality of pipe support members 4, each pipe support member of said plurality of pipe support members being spaced from an adjacent pipe support member of said plurality of pipe support members and having an outer pipe surface contact 4',
wherein a first pipe support member 4a of said plurality of pipe support members is spaced from a second pipe support member 4b of said plurality of pipe support members, and
wherein said second pipe support member is spaced from a third pipe support member 4c of said plurality of pipe support members
a plurality of flexible connection members 5,
wherein at least one flexible connection member of said plurality of flexible connection members connects adjacent pipe support members of said plurality of pipe support members,
wherein a first flexible connection member 5a of said plurality of flexible connection members connects said first pipe support member to said second pipe support member, and
wherein a second flexible connection member 5b of said plurality of flexible connection members connects said second pipe support member to said third pipe support member;
    a blade support portion 7 being connected to said first pipe support member by a blade support flexible connection member 7c; and
    a cutting blade 3 mounted to said blade support portion,
wherein said plurality of pipe support members, said plurality of flexible connection members, and said blade support portion define an opening extending along a predetermined axis,
wherein said cutting blade extends into said opening along a plane extending at right angles to said predetermined axis,
wherein each outer pipe surface contact of each pipe support member of said plurality of pipe support members is arranged around said predetermined axis by a respective pipe support member of said plurality of pipe support members and respective flexible connection members of said plurality of flexible connection members so as to align an outer surface of a pipe received in said opening with said cutting blade
wherein a respective outer pipe surface contact of said first pipe support member, said blade support flexible connection member, and said first flexible connection member are arranged around said predetermined axis, and
wherein a respective outer pipe surface contact of said second pipe support member, said blade support flexible connection member, said first flexible connection member, and said second flexible connection member are arranged around said predetermined axis.

15. A cutting tool 1 for cutting pipes of varying diameters, comprising:
   a first pipe support member 4a having a first outer pipe surface contact 4'a;
   a second pipe support member 4b having a second outer pipe surface contact 4'b and being spaced from said first pipe support member;
   a third pipe support member 4c having a third outer pipe surface contact 4'c and being spaced from said second pipe support member;
   a first flexible connection member 5a connecting said first pipe support member to said second pipe support member;
   a second flexible connection member 5b connecting said second pipe support member to said third pipe support member;
   a third flexible connection member 5c being connected to said third pipe support member;
   a blade support portion 7 being connected to said first pipe support member by a blade support flexible connection member 7c; and
   a cutting blade 3 mounted to said blade support portion so as to extend into said opening along a plane extending at right angles to said predetermined axis, wherein said first outer pipe surface contact of said first pipe support member, said blade support flexible connection member, and said first flexible connection member are arranged around said predetermined axis so as to align an outer surface of a pipe received in said opening with said cutting blade, wherein said second outer pipe surface contact of said second pipe support member, said blade support flexible connection member, said first flexible connection member, and said second flexible connection member are arranged around said predetermined axis so as to align the outer surface of the pipe received in said opening with said cutting blade, and wherein said third outer pipe surface contact of said third pipe support member, said blade support flexible connection member, said first flexible connection member, said second flexible connection member, and said third flexible connection member are arranged around said predetermined axis so as to align the outer surface of the pipe received in said opening with said cutting blade.

* * * * *